United States Patent Office 3,723,367
Patented Mar. 27, 1973

---

3,723,367
ALKALI METAL MERCAPTIDES AS URETHANE-ISOCYANURATE CATALYSTS
Sui-Wu Chow, Somerville, and Markus Matzner, Edison, N.J., assignors to Union Carbide Corporation, New York, N.Y.
No Drawing. Filed Mar. 27, 1972, Ser. No. 238,588
Int. Cl. C08g 22/40, 22/44
U.S. Cl. 260—2.5 AB                                     13 Claims

ABSTRACT OF THE DISCLOSURE

Alkali metal mercaptides have been found useful as catalysts in the reaction of organic isocyanates with compounds having a reactive hydrogen atom. The catalysts are particularly effective in the production of urethane and isocyanurate compounds.

BACKGROUND OF THE INVENTION

Within the past twenty years a completely new industry has evolved directed to the production of isocyanurate and urethane compositions. The greatest impetus in this area was the discovery that amines and certain tin compounds could be used as catalysts in their production. While many other catalysts have been developed, the amines and tin compounds are still, on the whole, the preferred catalysts. However, in some applications, for example, in the production of large castings, these catalysts are not sufficiently active for satisfactory commercial operation.

SUMMARY OF THE INVENTION

It has now been found that alkali metal mercaptides having at least one mercaptide group in the molecule can be used as catalysts in the production of urethane and isocyanurate compounds. These alkali metal mercaptides display a catalytic activity that can surpass that of the previously known amine, tin, or other catalysts, particularly in the area of cast moldings.

DESCRIPTION OF THE INVENTION

The compounds now found useful as catalysts in the reaction of an organic isocyanate having at least one reactive isocyanato group of the formula —NCO with a compound having at least one reactive hydrogen atom as determined by the Zerewitinoff method described in Journal of the American Chemical Society, vol. 49, page 3181 (1927), are the alkali metal mercaptides having at least one mercaptide group in the molecule. Any alkali metal mercaptide can be used, including the monomercaptides and polymercaptides, provided that there are no substituents in the molecule that will unduly interfere with the reaction between the isocyanato group and the reactive hydrogen atom and prevent their inter-reaction. The mercaptides are characterized by the presence in the molecule of at least one mercaptide group of the formula —SM, wherein M is an alkali metal atom such as lithium, sodium or potassium. The simplest mercaptides are those containing only one such group; however, the compounds suitable for use can contain as many as six or more mercapto or mercaptide groups in the molecule. There can also be present in the molecule other substituent groups, such as amino, carboxyl, hydroxyl, halogen, ester linkages, ether linkages, amido linkages, or any other group which would not exert a deterring effect on the reaction.

The catalysts can be any of the alkali metal mercaptides; these compounds are well known to those skilled in the art. It is known that they can contain a single mercaptide group in the molecule and that they can have larger numbers thereof; it is also known that they can be aliphatic, aromatic, heterocyclic, cycloaliphatic or polymeric in nature. The nature of the compound is not the controlling factor, the presence in the molecule of the —SM group is the factor which imparts catalytic activity to the molecule. Thus, in the broadest sense the catalysts can be defined by the formula:

I                   $X(SM)_n$ 

wherein X is the organic moiety to which the —SM group is attached and $n$ is an integer having a positive value which can be as high as six and even higher in polymeric substances. The organic moiety X can be an unsubstituted or substituted monovalent or polyvalent group. Thus, it can be a monovalent alkyl group of from 1 to 20 carbon atoms, or an alkenyl group of from 2 to 20 carbon atoms, or an aryl or alkaryl or aralkyl group of from 6 to 10 ring carbon atoms, or a cycloalkyl or cycloalkenyl group of from 5 to 6 ring carbon atoms, or a heterocyclic group containing ring carbon atoms and nitrogen or sulfur or oxygen ring atoms which ring can have 5 or 6 members; or, it can be a polyvalent radical of any of said groups when there are two or more —SM groups attached to the X moiety. It can also be a polymer chain to which the —SM groups are attached.

Illustrative of suitable alkali metal mercaptides one can mention sodium methylmercaptide, lithium methylmercaptide, potassium methylmercaptide, sodium n-butylmercaptide, lithium sec-butylmercaptide, sodium 2-ethylhexylmercaptide, lithium neopentylmercaptide, sodium 1,2-dimethylpropylmercaptide, sodium hexylmercaptide, lithium decylmercaptide, lithium dodedcylmercaptide, sodium hexadecylmercaptide, potassium tetradecylmercaptide, lithium eicosylmercaptide, lithium octadecylmercaptide, sodium 2-hydroxyethylmercaptide, lithium 2-ethyl-6-hydroxyethylmercaptide, sodium 14-hydroxytetradecylmercaptide, sodium carboxymethylmercaptide, lithium 2-carboxyethylmercaptide, lithium 9-carboxynonylmercaptide, sodium 2-aminoethylmercaptide, sodium 5-aminopentylmercaptide, lithium 4-hexenylmercaptide, sodium phenylmercaptide, lithium phenylmercaptide, potassium phenylmercaptide, lithium 1-naphthylmercaptide, sodium triphenylmethylmercaptide, sodium 4-chlorophenylmercaptide, lithium benzylmercaptide, sodium benzylmercaptide, potassium benzylmercaptide, sodium phenethylmercaptide, lithium chlorobenzylmercaptide, sodium tolylmercaptide, lithium xylylmercaptide, lithium cumylmercaptide, lithium naphthalmercapide, lithium 2-methylnaphthylmercaptide, sodium cyclopentylmercaptide, lithium dicyclopentylmercaptide, sodium cyclohexylmercaptide, sodium cyclopentenylmercaptide, lithium cyclohexenylmercaptide, 1,3,4-thiadiazole-2,5-di(sodiomercaptide). Also suitable are the alkali metal salts of 2-mercaptobenzimidazole, 2-mercaptobenzothiazole, octane dithiol, 2-mercaptobenzoxazole, 2-mercapto-1-methylimidazole, 2-mercapto-4-methylpyrimidine, and the reaction product of sodium sulfide with oligomers of epichlorohydrin as well as poly(alpha-mercaptomethyl ethylene oxide).

The alkali metal mercaptide catalyst is used at a concentration of from about 0.01 to about 2 percent by weight, preferably from about 0.05 to 1 percent by weight of the reaction mixture. Any catalytic amount sufficient to catalyze the reaction can be employed.

With the use of the catalysts of this invention one can produce solid elastomeric polyurethanes, or flexible, semiflexible, semi-rigid or rigid polyurethane foams. All of these types are well known commercially and those skilled in the art are fully familiar with the reactants necessary to produce a particular type of product. Thus, it is known that flexible products are obtained in the absence of highly functional crosslinkers or in the absence of large amounts of polyols and polyisocyanates having functionalities greater than two. It is also known that as the functionality of the reactants is increased the rigidity of the final product increases. In addition, it is known that the inclusion of a foaming agent will produce a foam while the exclusion of such agent will result in a solid non-foamed product.

Any of the conventional polyether polyols can be used, also useful are the known polyester polyols. These are so well known in the art that they do not require a detailed and elaborate description herein. However, illustrative thereof, one can mention the following types:

(a) Polyoxyalkylene polyols including the adducts of alkylene oxides with, for example, water, ethylene glycol, diethylene glycol, propylene glycol, dipropylene glycol, glycerol, 1,2,6-hexanetriol, 1,1,1-trimethylolethane, 1,1,1-trimethylolpropane, pentaerythritol, sorbitol, sucrose, lactose, alpha-methylglucoside, alpha-hydroxyalkylglucoside, ammonia, triethanolamine, triisopropanolamine, ethylenediamine, diethylenetriamine, novolac resins, phosphoric acid, benzenephosphoric acid, polyphosphoric acids such as tripolyphosphoric acid and tetrapolyphosphoric acid, phenol-aniline-formaldehyde ternary condensation products, aniline-formaldehyde condensation products, and the like. The alkylene oxides employed in producing the polyoxyalkylene polyols normally have from 2 to 4 carbon atoms. Propylene oxide and mixtures of propylene oxide with ethylene oxide are preferred. It is known that the random or block structures can be obtained depending upon the particular known procedures used for their preparation.

(b) Polyesters of polyhydric alcohols and polycarboxylic acid such as those prepared by the reaction of an excess of ethylene glycol, propylene glycol, 1,1,1-trimethylolpropane, glycerol, or the like, with phthalic acid, adipic acid, and the like.

(c) Lactone polyols prepared by reacting a lactone such as epsilon-caprolactone or a mixture of epsilon-caprolactone and an alkylene oxide with a polyfunctional initiator such as a polyhydric alcohol, an amine, or an amino-alcohol.

(d) Phosphorus-containing derivatives such as tris(dipropylene) glycol phosphite and other phosphites.

(e) The polymer/polyols produced by the in situ polymerization of a vinyl monomer in a polyol, as disclosed in U.S. 3,304,273, U.S. 3,383,351 and U.S. 3,523,093.

The foregoing are merely illustrative and represent only a small number of the many polyols known in the art that can be employed with the alkali metal mercaptide catalysts in the process of this invention.

The polyol or polyol mixture employed can have a hydroxyl number which can vary over a wide range. In general, the hydroxyl number of the polyols employed can range from about 20, and lower, to about 1000, and higher, preferably from about 30 to about 800, and more preferably, from about 35 to about 700. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{M.W.}$$

where

OH = hydroxyl number of the polyol
$f$ = average functionality, that is, the average number of hydroxyl groups per molecule of polyol
M.W. = average molecular weight of the polyol The exact polyol employed depends upon the end-use of the polyurethane foam. The molecular weight and the hydroxyl number are selected properly to result in flexible, semi-flexible, or rigid product. The polyol preferably possesses a hydroxyl number of from about 200 to about 1000 when employed in rigid foam formulations, from about 50 to about 250 for semi-flexible foams, and from about 20 to about 70 or more when employed in flexible foam formulations. Such limits are not intended to be restrictive, but are merely illustrative of the large number of possible combinations of the polyols that can be employed.

Also useful are the monofunctional compounds such as ethanol, propanol, 2-ethylhexanol, phenol or benzyl alcohol when a monourethane is to be produced.

The isocyanates that can be used can be either monoisocyanates or polyisocyanates and illustrative thereof one can mention phenyl isocyanate, octyl isocyanate, tolyl isocyanate, naphthyl isocyanate, ethyl isocyanate, and similar monoisocyanates; alkylene diisocyanates, such as ethylene diisocyanate, trimethylene diisocyanate, tetramethylene diisocyanate, pentamethylene diisocyanate, hexamethylene diisocyanate; alkylene diisocyanates, such as propylene-1,2-diisocyanate, butylene-1,2-diisocyanate, butylene-1,3-diisocyanate, butylene-2,3-diisocyanate; alkylidene diisocyanates, such as ethylidene diisocyanate, butylidine diisocyanate; cycloalkylene diisocyanates, such as cyclopentylene-1,3-diisocyanate, cyclohexylene-1,2-diisocyanate, cyclohexylene-1,3-diisocyanate, cyclohexylene-1,4-diisocyanate; cycloalkylidene diisocyanates such as cyclopentylidene diisocyanate, cyclohexylidene diisocyanate; aromatic diisocyanates, such as m-phenylene diisocyanate, p-phenylene diisocyanate, polymethylene polyphenylisocyanate, 2,4-tolylene diisocyanate, 2,6-tolylene diisocyanate, dianisidine diisocyanate, bitolylene diisocyanate, naphthalene-1,4-diisocyanate, diphenylene-4,4'-diisocyanate; aliphatic-aromatic diisocyanates, such as xylylene-1,4-diisocyanate, xylylene-1,3-diisocyanate, bis(4-isocyanatophenyl)methane, bis(3-methyl-4-isocyanatophenyl)methane, 4,4'-diphenylpropane diisocyanate; the polyisocyanates as disclosed in U.S. Pat. 2,683,730, as well as the polyisocyanates listed in the publication of Siefken, Annalen, 562, pages 122–135 (1949). Also included are durylene diisocyanate, 4,4',4''-tris(isocyanatophenyl)methane, 3,10-diisocyanatotricyclo[5.2.1.0$^{2,6}$]decane, bis(2 - isocyanatoethyl) carbonate, and the like. Any known isocyanate can be used.

When a foam is desired, foaming can be accomplished by employing a minor amount (for example, from about 0.5 to 25 weight percent, based on total weight of the reaction mixture), of blowing agents which are vaporized by the exotherm of the isocyanato-reactive hydrogen reaction. The preferred blowing agents are certain halogen-substituted aliphatic hydrocarbons which have boiling points between about −40° C. and 70° C., and which vaporize at or below the tempertaure of the foaming mass. The blowing agents include, for example, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1,1-difluoro-1,2,2-trichloroethane, chloropentafluoroethane, 1 - chloro-1-fluoroethane, 1-chloro-2-fluoroethane, 1,1,2-trichloro-1,2,2-trifluoroethane, 1,1,1-trichloro-2,2,2-trifluoroethane, 2-chloro-1,1,1,2,3,3,4,4,4-nonafluorobutane, hexafluorocyclobutene, and octofluorocyclobutane. Other useful blowing agents include water and low-boiling hydrocarbons such as butane, pentane, hexane, cyclohexane, and the like. Many other compounds easily volatilized by the exotherm of the isocyanato-reactive hydrogen reaction also can be employed. A further class of blowing agents includes the thermally unstable compounds which liberate gases upon heating, such as N,N'-dimethyl-N,N'-dinitrosoterephthalamide.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gas are used to provide densities ranging from 30 to 1 pound per cubic foot respectively.

In addition to the alkali metal mercaptide catalyst of this invention one can also have present in the reaction mixture any of the known catalysts previously used in the production of polyurethanes. These can comprise from 0.05 to 1 weight percent or more of the reaction mixture. Illustrative thereof one can mention:

(a) Tertiary amines such as trimethylamine, triethylamine, N-methylmorpholine, N-ethylmorpholine, N,N-dimethylbenzylamine, N,N-dimethylethanolamine, N,N,N',N'-tetramethyl-1,3-butanediamine, triethanolamine, 1,4-diazabicyclo[2.2.2]octane, and the like;

(b) Tertiary phosphines such as trialkylphosphines, dialkylbenzylphosphines, and the like;

(c) Strong bases such as alkali and alkaline earth metal hydroxides, alkoxides, and phenoxides;

(d) Acidic metal salts of strong acids such as ferric chloride, stannic chloride, stannous chloride, antimony trichloride, bismuth nitrate and chloride, and the like;

(e) Chelates of various metals such as those which can be obtained from acetylacetone, benzoylacetone, trifluoroacetyl acetone, ethyl acetoacetate, salicylaldehyde, cyclopentanone-2-carboxylate, acetylacetoneimine, bis-acetylacetonealkylenediimines, salicylaldehydeimine, and the like, with various metals such as Be, Mg, Zn, Cd, Pb, Ti, Zr, Sn, As, Bi, Cr, Mo, Mn, Fe, Co, Ni, or such ions as $MoO_2^{++}$, and the like;

(f) Alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2-(N,N-dialkylamino)alkanols, such as well known chelates of titanium obtained by said or equivalent procedures;

(g) Salts of organic acids with a variety of metals such as alkali metals, alkaline earth metals, Al, Sn, Pb, Mn, Co, Ni, nd Cu, including, for example, sodium acetate, potassium laurate, calcium hexanoate, stannous acetate, stannous octoate, stannous oleate, lead octoate, metallic driers such as manganese and cobalt naphthenate, and the like;

(h) Organometallic derivatives of tetravalent tin, trivalent and pentavalent As, Sb, and Bi, and metal carbonyls of iron and cobalt.

The alkali metal mercaptide catalysts of this invention can be used in either the one shot process or the two step quasi-prepolymer process. In either case conventional fillers, stabilizers, inhibitors, scorch retarders, accelerators, pigments, surfactants, or other additives conventionally used in the production of polyurethanes can also be present in the amounts ordinarily employed.

It is also within the scope of the invention to employ small amounts, e.g. about 0.001% to 5.0% by weight, based on the total reaction mixture of an emulsifying agent such as a polysiloxane-polyoxyalkylene block copolymer having from about 10 to 80 percent by weight of siloxane polymer and from 90 to 20 percent by weight of alkylene oxide polymer, such as the block copolymers described in U.S. Pats. 2,834,748 and 2,917,480. Another useful class of emulsifiers is the group of "non-hydrolyzable" polysiloxane-polyoxyalkylene block copolymers. This class of compounds differs from the above mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 weight percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group and (b) an alkali metal salt of a polyoxyalkylene polymer to a temperature sufficient to cause the polysiloxane polymer and the salt to react to form the block copolymer. Although the use of an emulsifier is desirable to influence the type of foam structure that is formed, in some instances foam products can be prepared without emulsifiers. In addition to the emulsifiers or surfactants referred to above one can use any of the more recently developed products that have become available for this purpose.

In producing the polyurethanes, the amount of polyisocyanate employed is dependent, in part, upon such factors as the nature of the reactants, the nature of the end-use for the polyurethane product, and the like. In general, however, the ratio of total isocyanato equivalent to total reactive hydrogen equivalent (i.e., total equivalent of alcoholic hydroxyl plus water, if water is employed in the formulation) is ordinarily such as to provide enough isocyanato equivalents to react with all reactive hydrogen equivalents present. Preferably, the ratio of isocyanato equivalents to reactive hydrogen equivalents is about 1.0 to 1.1.

It has been found that the final product produced by the process of this invention contains both urethane and isocyanurate groups in the molecule. It has also been found that the alkali metal mercaptides exert an enhanced catalytic activity that surpasses that of any of the previously employed catalysts with cold cure foams and cast molded elastomeric articles being produced in a fraction of the time originally found necessary in the past. It was further found that the mercaptans per se are rarely active as catalysts when used by themselves, but that their corresponding alkali metal mercaptides are highly active.

A solvent can be used to dissolve the catalyst and for this purpose any suitable organic solvent can be used. As examples of useful solvents dimethylformamide, dimethylsulfoxide, sulfolane, diethylene glycol, ethylene glycol, dioxane, tetrahydrofuran are illustrative.

The alkali metal mercaptides are readily prepared by known methods, one of which is the reaction of the alkali metal or the alkali metal hydride with the organic mercaptan, preferably in solution. The above solvents can be used in the reaction.

The following test procedures were used in evaluating the products:

| | |
|---|---|
| Foam density, g./cc. | Determined by volume of water displaced and weight of sample. |
| Hardness, Shore D | ASTM–D2240. |
| Tensile strength, p.s.i. | ASTM–D412. |
| Elongation, percent | ASTM–D412. |
| Compression modulus at 50% Deflection, p.s.i. | ASTM–D575. |
| Die "C" tear, p.l.i. | ASTM–D624C. |

The following examples serve to further illustrate the invention.

EXAMPLE 1

A series of formulations was prepared containing the following components:

(a) 100 parts of polymer/polyol A [1] having a hydroxyl number of 28
(b) 5 parts of the reaction product of one mole of aniline with two moles of propylene oxide
(c) 11 parts of diethylene glycol
(d) 42.5 parts of prepolymer A [2]
(e) 7.5 parts of methylene chloride
(f) disodium mercaptoacetate ($Na-S-CH_2-COONa$) as indicated in the table (as a 13.6 percent solution in ethylene glycol) in weight percent of catalyst based on total polyols

[1] Polymer/polyol A is the product obtained by the in situ polymerization of 20 weight percent acrylonitrile with the block polyether polyol obtained by the sequential reaction of glycerine with ethylene oxide to a hydroxyl number of from about 600 to 700, then propylene oxide to a hydroxyl number of from about 40 to 50 and then ethylene oxide to a hydroxyl number of from about 30 to 35.

[2] Prepolymer A is the reaction product obtained by the reaction of an 80/20 mixture of 2,6- and 2,4-tolylene diisocyanates with the adduct of glycerine and propylene oxide having a hydroxyl number of 650; the prepolymer has a free isocyanato content of about 30 weight percent.

The formulations were rapidly and thoroughly mixed, after the catalyst had been added, in a suitable container which also served as the mold, and allowed to stand at room temperature. An exothermic reaction ensued and useful microcellular semi-rigid foams were produced that could be demolded within one minute. The results are tabulated below:

| Formulation | a | b | c |
|---|---|---|---|
| Disodium mercaptoacetate, percent | 0.036 | 0.061 | 0.072 |
| Dibutyltin dilaurate, percent | 0.3 | 0 | 0 |
| Cream time, seconds | 30 | 28 | 23 |
| No-tack time, seconds | 45 | 51 | 42 |
| Foam density, lb/cu. ft | 0.57 | 0.53 | 0.55 |
| Demolding time | Less than one minute | | |

EXAMPLE 2

Using the same formulation and procedure described in Example 1, a series of satisfactory, readily demoldable, foams were produced when substituting sodium phenylmercaptide as the catalyst. The results are tabulated below:

| Formulation | a | b | c |
|---|---|---|---|
| Sodium phenylmercaptide, percent | 0.053 | 0.053 | 0.053 |
| Dibutyltin dilaurate, percent | 0 | 0.3 | 0.1 |
| Cream time, seconds | | | 8 |
| No-tack time, seconds | 64 | 48 | 40 |
| Foam density, lb./cu. ft | 0.52 | 0.57 | 0.55 |
| Demolding time | Less than one minute | | |

EXAMPLE 3

Using the same formulation and procedure described in Example 1, a series of satisfactory, readily demoldable foams were produced when substituting lithium phenylmercaptide as the catalyst. The results are tabulated below:

| Formulation | a | b | c |
|---|---|---|---|
| Lithium phenylmercaptide, percent | 0.031 | 0.062 | 0.093 |
| Cream time, seconds | 85 | 20 | 18 |
| No-tack time, seconds | 150 | 80 | 60 |
| Demolding time | Less than three minutes | | |

EXAMPLE 4

Using the same formulation and procedure described in Example 1, a microcellular semi-rigid foam that was readily demoldable was produced when substituting 0.06 percent of sodium 2-hydroxyethylmercaptide as the sole catalyst in the formulation. A cream time of 20 seconds and a no-tack time of 60 seconds were measured.

EXAMPLE 5

Using the same formulation and procedure described in Example 1, a microcellular semi-rigid foam that was readily demoldable was produced when substituting 0.06 percent of 1,3,4-thiadiazole-2,5-di(potassio-mercaptide) as the sole catalyst in the formulation. A cream time of 90 seconds and a no-tack time of 170 seconds were measured.

EXAMPLE 6

Using the same formulation and procedure described in Example 1, a microcellular semi-rigid foam that was readily demoldable was produced when substituting 0.06 percent of sodium cyclohexylmercaptide as the sole catalyst in the formulation. A cream time of 30 seconds and a no-tack time of 90 seconds were measured.

EXAMPLE 7

Using the same formulation and procedure described in Example 1, a microcellular semi-rigid foam that was readily demoldable was produced when substituting 0.06 percent of sodium octadecylmercaptide as the sole catalyst in the formulation. A cream time of 30 seconds and a no-tack time of 50 seconds were measured.

EXAMPLE 8

Using the same formulation and procedure described in Example 1, a microcellular semi-rigid foam that was readily demoldable was produced when substituting 0.06 percent of sodium triphenylmethylmercaptide as the sole catalyst in the formulation. A cream time of 60 seconds and a no-tack time of 150 seconds were measured.

For comparative purposes two formulations were prepared that did not contain alkali metal mercaptide. While these formulations had comparable cream time and no-tack time because of the amount of catalyst present, they were not as readily demoldable and it was necessary to leave them in the molds for periods from 3 to 5 times longer than the periods required in Examples 1 to 8. The formulations used are described below:

| Formulation | a | b |
|---|---|---|
| Polymer/polyol A, g | 24.75 | 24.75 |
| Adduct of 1 mole of aniline with 2 moles propylene oxide, g | 1.24 | 1.24 |
| Diethylene glycol, g | 2.71 | 2.71 |
| Prepolymer A, g | 10.6 | 10.6 |
| Methylene chloride, g | 1.9 | 1.9 |
| Dibutyltin dilaurate, percent | 0.3 | 0.3 |
| 1,4-diazabicyclo[2.2.2] octane, percent | | 0.13 |
| Cream time, seconds | 44 | 60 |
| No-tack time, seconds | 87 | 80 |
| Demolding time, minutes | 3.5 | 3.5 |

EXAMPLE 9

A formulation was prepared containing the following components:

(a) 50 parts of polymer/polyol A (see Example 1)
(b) 21.7 parts of an 80/20 mixture of 2,6- and 2,4-tolylene diisocyanates
(c) 1 part of trichlorofluoromethane
(d) 0.03 percent by weight, based on the polymer/polyol, of sodium phenylmercaptide.

The formulation was rapidly and thoroughly mixed in a suitable container after the catalyst had been added, and allowed to stand at room temperature and exothermically react to produce a semi-rigid foam that could be demolded within one minute. The reaction had a cream time of 22 seconds, a gel time of 26 seconds and a no-tack time of 54 seconds.

EXAMPLE 10

A series of formulations was prepared containing the following components:

(a) 53 parts of polycaprolactone polyester,[3] hydroxyl number of 212
(b) 27.4 parts of propolymer A (see Example 1) having a free isocyanate content of about 32 weight percent
(c) 2 parts of trichlorofluoromethane
(d) alkali metal mercaptide catalyst as indicated in the table below, based on polyol.

[3] The polycaprolactone polyester is a diol with an average molecular weight of about 530.

The formulations were rapidly and thoroughly mixed in suitable containers after the catalyst had been added, and allowed to stand at room temperature and exothermically react to produce flexible foams that could be demolded within one minute. The results are tabulated below:

| Formulation | a | b | c |
|---|---|---|---|
| Sodium phenylmercaptide, percent | 0.035 | 0 | 0 |
| Disodium mercaptoacetate, percent | 0 | 0.036 | 0.013 |
| Dibutyltin dilaurate, percent | 0 | 0 | 0.25 |
| Cream time, seconds | 39 | 10 | 60 |
| Gel time, seconds | 50 | 14 | 70 |
| No-tack time, seconds | 80 | 30 | 98 |
| Demolding time | Less than two minutes | | |

EXAMPLE 11

A formulation was prepared containing the following components:

(a) 99.2 parts of polymer/polyol A (see Example 1)
(b) 49 parts of the reaction product of one mole of aniline with two moles of propylene oxide
(c) 10.9 parts of diethylene glycol
(d) 50 parts of prepolymer A (see Example 1)
(e) 0.035 weight percent based on total polyols of disodium mercaptoacetate
(f) 0.3 weight percent, based on total polyols, of dibutyltin dilaurate.

The formulation was rapidly and thoroughly mixed in a suitable container after the catalyst had been added under conditions which would not mix air into the reaction mixture. It was allowed to stand at room temperature and exothermically react to produce a solid, transparent, orange-colored cast product that could be demolded in less than one minute.

EXAMPLE 12

Elastomers were produced using the alkali metal mercaptide catalyst of this invention and, for comparative purposes, a conventional tin catalyst. The elastomers produced with the sodium phenylmercaptide showed no flow or tack within seconds and could be removed from the mold within one minute. The elastomers produced with the conventional dibutyltin dilaurate required from 8 to 9 minutes to develop to the no flow stage and 24 or 55 minutes to the no-tack stage, even at the higher catalyst concentrations required, and it was necessary to leave them in the mold for a considerable period of time before they could be safely removed without distortion. The formulations and results are set forth below:

| Formulation | a | Control a | b | Control b |
|---|---|---|---|---|
| Polymer/polyol A, g | 40 | 40 | 40 | 40. |
| Prepolymer A of Ex. 10, g | 2.74 | 2.74 | | |
| Tolylene diisocyanate, g | | | 1.74 | 1.74. |
| Sodium phenylmercaptide, percent | 0.03 | | 0.03 | |
| Dibutyltin dilaurate, percent | | 0.3 | | 0.3 |
| No flow time | 5 sec | 8 min | 3 sec | 9 min. |
| No tack time | 10 sec | 24 min | 6 sec | 55 min. |

EXAMPLE 13

A formulation was prepared containing the following components:

(a) 99.2 parts of polymer/polyol A (see Example 1)
(b) 4.9 parts of the reaction product of one mole of aniline with two moles of propylene oxide
(c) 10.9 parts of diethylene glycol
(d) 42.5 parts of prepolymer A (see Example 1)
(e) 7.5 parts of methylene chloride
(f) 0.07 weight percent based on total polyols of sodium phenylmercaptide
(g) 0.13 weight percent based on total polyols of 1,4-diazabicyclo[2.2.2]octane
(h) 0.3 weight percent based on total polyols of dibutyltin dilaurate The formulation was rapidly and thoroughly mixed in a suitable container after the catalyst had been added, and allowed to stand at room temperature and exothermically react to produce a semi-rigid foam having the following properties that was removable from the mold in less than one minute.

| | |
|---|---|
| Hardness, Shore A | 83 |
| Density, pcf (ASTM–D1564) | 46.2 |
| Tensile strength, p.s.i. | 952 |
| Elongation, percent | 92 |
| Compression modulus at 50% deflection, p.s.i. | 1390 |
| Die "C" tear, p.l.i. | 114 |

What is claimed is:

1. In the process for reacting an organic polyisocyanate with a polyol to produce a polymer having urethane and isocyanurate linkages, the improvement of using an alkali metal mercaptide as the catalyst, said process optionally including a blowing agent.

2. The process as claimed in claim 1 wherein a flexible foam is produced.

3. The process as claimed in claim 1 wherein a semi-flexible or semi-rigid foam is produced.

4. The process as claim 1 wherein a rigid foam is produced.

5. The process as claimed in claim 1 wherein a solid elastomer is produced.

6. The process as claimed in claim 1 wherein the catalyst is disodium mercaptoacetate.

7. The process as claimed in claim 1 where the catalyst is sodium phenylmercaptide.

8. The process as claimed in claim 1 wherein the catalyst is lithium phenylmercaptide.

9. The process as claimed in claim 1 wherein the catalyst is sodium 2-hydroxyethylmercaptide.

10. The process as claimed in claim 1 wherein the catalyst is 1,3,4-thiadiazol-2,5-di(potassiomercaptide).

11. The process as claimed in claim 1 wherein the catalyst is sodium n-hexylmercaptide.

12. The process as claimed in claim 1 wherein the catalyst is sodium octadecylmercaptide.

13. The process as claimed in claim 1 wherein the catalyst is sodium triphenylmethylmercaptide.

References Cited

UNITED STATES PATENTS

| | | | |
|---|---|---|---|
| 3,645,927 | 2/1972 | Andres | 260—2.5 AB |
| 3,634,345 | 1/1972 | Dienr | 260—248 NS |
| 3,620,985 | 11/1971 | Larkin | 260—2.5 AB |
| 3,516,950 | 6/1970 | Haggis | 260—2.5 AW |
| 3,391,091 | 7/1968 | Considine | 260—2.5 AB |
| 3,381,008 | 4/1968 | Steyermark | 260—248 NS |
| 3,330,828 | 7/1967 | Grogler | 260—248 NS |
| 3,108,975 | 10/1963 | Lambert | 260—77.5 AB |

FOREIGN PATENTS

| | | | |
|---|---|---|---|
| 908,337 | 10/1962 | Great Britain | 260—2.5 AB |
| 901,056 | 7/1962 | Great Britain | 260—77.5 AB |
| 580,788 | 8/1959 | Canada | 260—2.5 AB |

DONALD E. CZAJA, Primary Examiner

C. W. IVY, Assistant Examiner

U.S. Cl. X.R.

260—2.5 AC, 2.5 AW, 77.5 AB, 77.5 AC, 77.5 NC, 248 NC